Dec. 14, 1965 H. KONET 3,222,937
GYROSCOPE
Filed Jan. 23, 1959 3 Sheets-Sheet 1

INVENTOR.
HENRY KONET
BY Bauer and Seymour
ATTORNEYS

Dec. 14, 1965

H. KONET 3,222,937

GYROSCOPE

Filed Jan. 23, 1959

INVENTOR.
HENRY KONET
BY
Bauer and Seymour
ATTORNEYS

Dec. 14, 1965     H. KONET     3,222,937

GYROSCOPE

Filed Jan. 23, 1959     3 Sheets-Sheet 3

INVENTOR.
HENRY KONET
BY
*Bauer and Seymour*
ATTORNEYS

United States Patent Office 3,222,937
Patented Dec. 14, 1965

3,222,937
GYROSCOPE
Henry Konet, Ho-Ho-Kus, N.J., assignor to Special Devices Laboratories, Inc., South Orange, N.J., a corporation of New Jersey
Filed Jan. 23, 1959, Ser. No. 788,642
35 Claims. (Cl. 74—5.6)

This invention relates to control apparatus and more particularly to gyroscopic instruments and gyroscopes therefor.

One of the objects of the present invention is to provide a novelly constructed gyroscope which is of utmost simplicity and yet rugged and extremely reliable in use.

Another object is the provision of a gyroscope having a minimum number of simple parts which may be assembled with facility into a small, compact and efficiently operable unit and disassembled readily for any necessary repairs or replacements.

It is another object of the invention to provide a gyroscope which is highly sensitive to angular movement about a preselected axis so that the resulting precession may be used for the precise control, about such axis, of a body such as an aircraft, ship or the like.

A further object is to provide a gyroscopic control instrument which may be made small, compact and easily attached to and detached from the control unit of which it forms a component part, and readily serviced and repaired.

A still further object is to provide a rate gyroscope of relatively simple compact form in which the moment of inertia of the rotor is a maximum for any given mass thereof and for any given size of surrounding case.

Yet another object is to provide a gyroscope wherein the function of damping is effected by an integral, component arrangement and construction of the rotor mounting itself.

Another object is to afford a highly integrated gyroscopic instrument in which the precession-sensing pick-off is simple and novelly combined with the gyroscope but highly sensitive and at the same time adapted to assist in balancing or neutralizing the sensitive element.

A still further object is to provide a gyroscope structure wherein the gyro roto and its stator are mounted to precess as a unit and hence have no relative angular motion other than about the axis of spin so that the torque applied to the rotor by the stator is constant and speed variations of the rotor are avoided.

Another object is to provide a constrained rate responsive gyroscope which is adaptable to many uses, simple in construction, reliable and long-lived in operation and a general advance in the art.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views:

FIG. 7 is a wiring diagram of the pick-off.

A single embodiment of the invention is illustrated in the accompanying drawings, by way of example, in the form of a small size rate gyroscope of the restrained, two-degree-of-freedom type, but it will be clear from the description which follows that novel features of the invention are applicable to other types of gyroscopes and that such gyroscopes are useful for other types of instrumentations.

*The pedestal and gimbal mounting*

Figure 5:
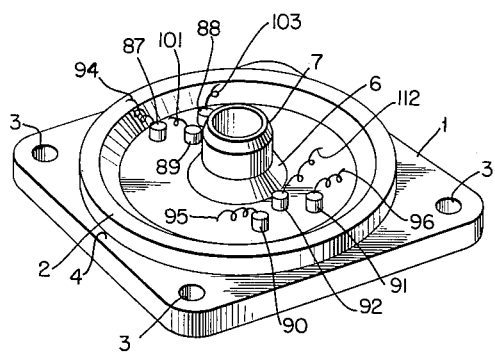
FIG. 5 is an enlarged perspective view of the base or mounting plate.

Referring in detail to the specific embodiment illustrated in the drawing, 1 identifies a base generally square in outline and having an integral circular flange 2 upstanding from and centrally disposed with respect to the base. From FIG. 5 it is noted that the outer periphery of the flange is closely adjacent to the periphery of the base at each of the four central points thereof, to define a corresponding number of external areas such as 1a, provided with attaching holes 3. Flange 2 has a circular shoulder as indicated at 4, FIGS. 2 and 3, to provide a seat for the open lower end of a cylindrical case 5 having a closed top 5a. As shown, the parts may be conveniently so dimensioned that the case has a snug press fit over and about flange 2, with its outer surface tangent to the base at the aforesaid four central points of the sides thereof.

The top central portion of base 1 has a hollow conical protuberance or base 6 from the top of which extends a cylindrical sleeve 7 having its axis centrally of flange or rim 2. Base 1 is centrally counterbored upwardly from its lower face as indicated at 10, FIGS. 2 and 3, which, together with a flange 11, defines an abutment for a cap screw 13.

Figures 1, 2:
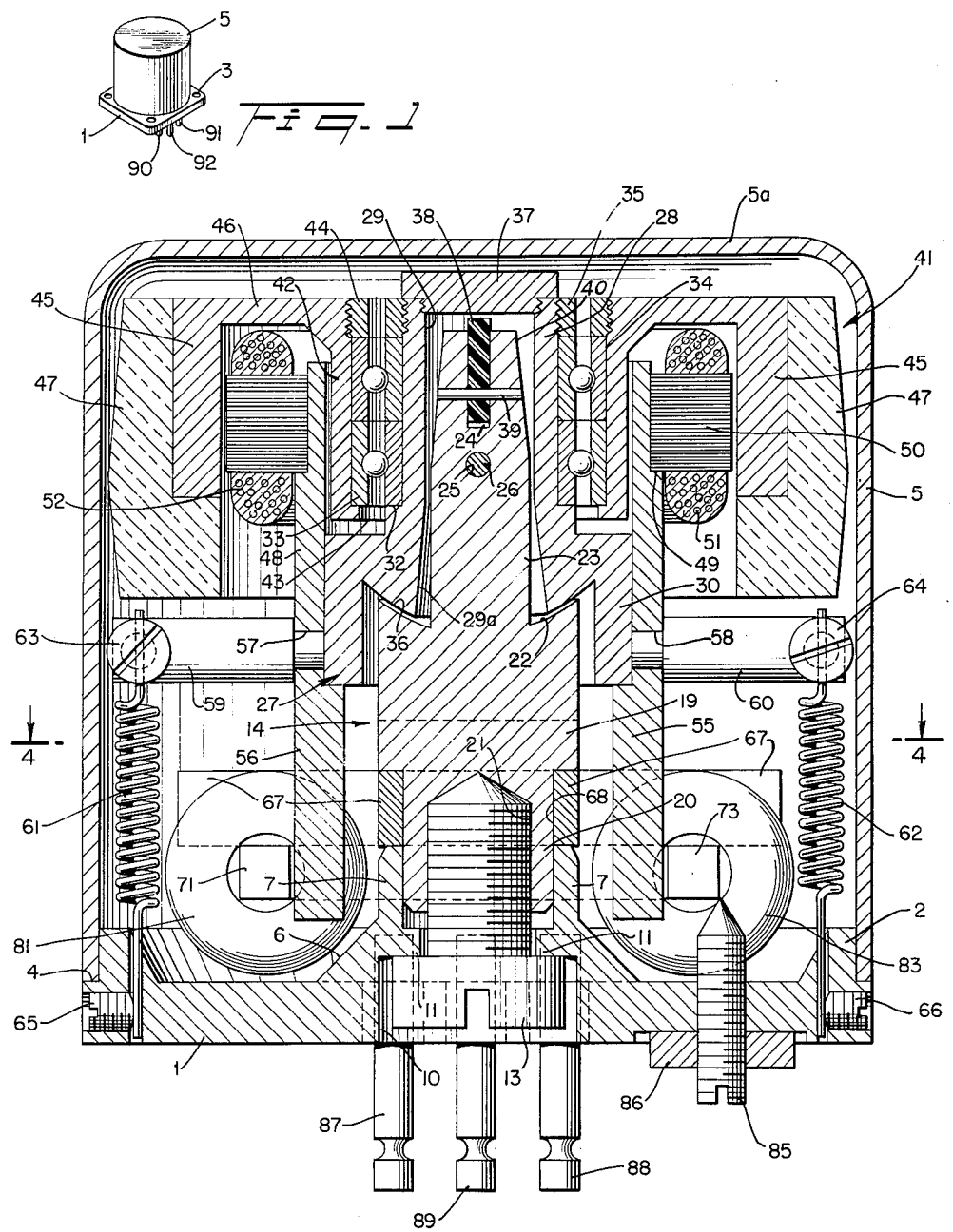
FIG. 1 is a full-scale perspective view of an illustrative embodiment of the assembled instrument showing its approximate size.
FIG. 2 is a cross-section to a greatly enlarged scale, taken in a plane identified by line 2—2, FIG. 4.
Figure 3:
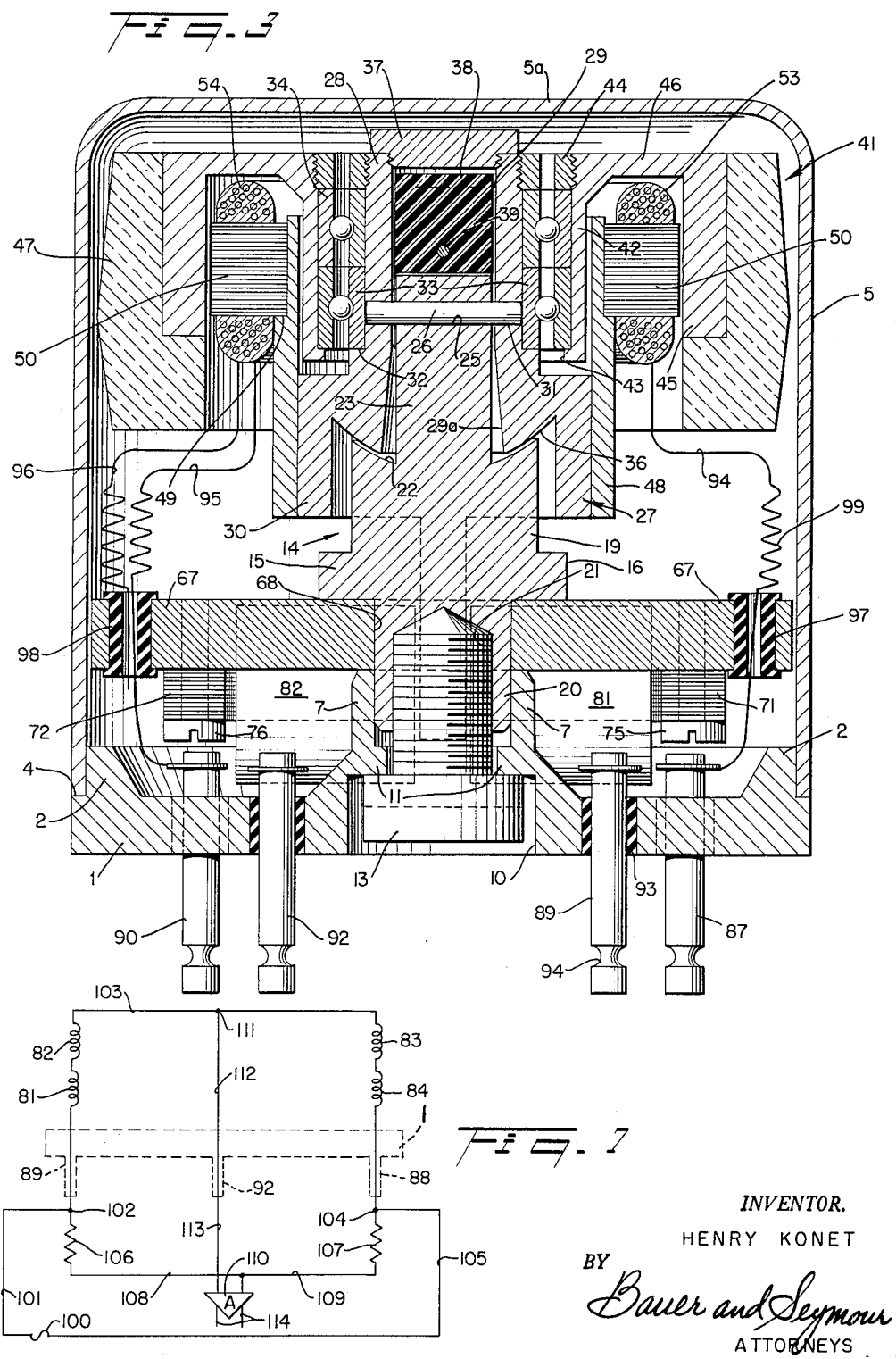
FIG. 3 is a cross sectional view to a scale corresponding with that of FIG. 2, taken in a plane identified by line 3—3, FIG. 4.
Figure 6:
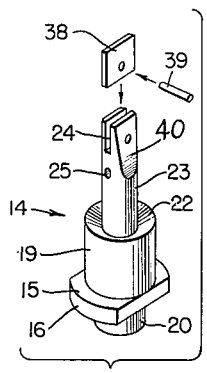
FIG. 6 is an enlarged perspective view of the pedestal mounting the gimbal and rotor.

As best shown in FIGS. 2, 3 and 6, the gyro pedestal is preferably a one-piece turning including a platform or flange 15 having its ends rounded as at 16 to define cylindrical surfaces coaxial of the central axis of base 1. Flange 15 is surmounted by a centrally disposed cylindrical extension 19 having a diameter at its base approximately the same as the transverse dimension of flange 15. A sleeve 20, FIGS. 2, 3 and 6, depends from flange 15 coaxially of extension 19 and has a tapped hole 21 to receive screw 13. From FIG. 3 it will be noted that the external diameter of sleeve 20 is less than that of extension 19 and is dimensioned to have a smooth fit in sleeve 7 so that when assembled therein and screw 13 is turned home, the head of the screw abuts flange 11 and and acts to seat the flange 15 firmly against a mounting plate 67 which surrounds sleeve 20 and is seated upon the upper end of sleeve 7.

The upper end 22 of extension 19 is spherically concave, as and for a purpose subsequently explained. A spindle 23 extends upwardly from this spherical surface coaxially with extension 19 and sleeve 20, and terminates in a flat end vertically slotted at 24. A hole 25 is drilled diametrically of spindle 23 to receive with a press fit, a shaft 26 whose ends project equal distances from the spindle. The intersection between the axis of hole 25 and the axis of spindle 23 determines a point which is the center of curvature of spherical surface 22, previously described.

The gimbal member and damper

The present invention contemplates a novel and structurally simple combination of the gyro gimbal and its supporting pedestal whereby ruggedness and reliability are attained with a minimum number of parts so constructed and assembled as to constitute damping means for the gimbal and thereby increase the overall simplicity and compactness of the instrument. In the form shown, the gimbal ring or member is identified at 27, FIGS. 2 and 3, and comprises essentially a sleeve 28 having an axial bore 29 of greater diameter than the corresponding dimension of spindle 23 so that in assembled relation it loosely encompasses the same. At its base, the sleeve 28 terminates in an enlarged cylindrical skirt 30. Sleeve 28 is provided with diametrically aligned holes 31, FIG. 3, which receive the ends of bearing shaft or pin 26 with a smooth fit so that the gimbal element 27 may pivot about the axis of the shaft relatively to the spindle 23 of the gyro pedestal. From FIGS. 2 and 3 it will be noted that axial bore 29 is enlarged at its lower end into a frusto-conical surface of revolution 29a coaxial of bore 29 to thereby increase the range of angular movement of the gimbal. Although the ends of shaft 26 are shown as being journalled directly in holes 31, it is contemplated that said shaft may, if desired, be supported by plain or anti-friction bearings of any suitable known type, such as ball or roller bearings, jewel and capstone bearings, and the like. If a gyroscope having a further degree of freedom is desired, shaft 26 could pivotally support a yoke on which the gimbal structure could in turn be pivoted on an axis extending at right angles to shaft 26 and the spin axis of the rotor.

Sleeve 28 has an external annular shoulder 32 forming the abutment for the inner race of the lower one 33 of two anti-friction rotor bearings. This inner race fits smoothly over sleeve 28 and when in assembled relation its inner surface extends over and contacts the ends of bearing shaft 26 to prevent or limit any play of the gimbal in a direction along the axis of the shaft. The upper anti-friction bearing 34 is a duplicate of the lower one and its inner race also fits over and about sleeve 28. The two bearings when assembled are in back-to-back relation thus providing for great compactness and facility in manufacture. A ring nut 35 is turned down over the upper externally threaded end of sleeve 28 to contact the inner race of bearing 34 and thereby hold the bearings against axial movement with respect to the sleeve.

The concave spherical surface formed by the upper end of extension 19 and identified at 22 has been previously described as having its center at the intersection of the vertical axis of spindle 23 and the axis of shaft 26. As clearly shown in FIGS. 2 and 3, the lower surface of the junction between sleeve 28 and skirt 30 is formed as a convex spherical surface having the same center. The clearance between the two cooperating spherical surfaces is small so that, referring to FIG. 2, there is formed an annular chamber for damping fluid between frusto-conical surface 29a and the opposing surface of spindle 23. Said chamber may be regarded as two chambers, one on each side of a vertical plane containing the axis of shaft 26, the volumes of which are inversely varied by and in response to relative pivotal motion of the pedestal and gimbal about the axis of shaft 26. The nature and relationship of the cooperating spherical surfaces on pedestal extension 19 and gimbal sleeve 28 are such that the same constitute sealing means for preventing leakage of damping fluid from said chambers. If desired, the seal could be accomplished with a flexible diaphragm bridging the gap between said surfaces or by means of a suitable O-ring gasket or the like.

The top end of sleeve 28 is sealed, such as by a cap 37 threaded thereto. If necessary, a gasket, not shown, may be provided between the cap and sleeve to assure a fluid-tight joint. A rectangular sheet or block of material 38, such as nylon, having a relatively high coefficient of thermal expansion, fits in slot 24 in the top of spindle 23 and is fixed therein by a pin 39. From FIG. 3 it will be noted that block 38 has a small clearance at its sides, with the surface of bore 29 and also at its top edge with relation to cap 37. FIGS. 2 and 6 show at 40 that the top of spindle 23 is chamfered or cut away at diametrically opposite sides and in planes parallel with the axis of hole 25, to provide for appreciable angular movement of the gimbal element without contact with the spindle. If desired, the bore 29 may be other than round in transverse section so that the clearance between spindle 23 and said bore in planes perpendicular to the shaft 26 may remain small and constant independently of the pivotal movement of the gimbal assembly.

Novel damping means are thus provided with a minimum of added parts by making novel use of other necessary parts of the instrument. The space between cap 37 and the top edge of block 38 forms a passage or orifice of constricted area between two chambers at opposite sides of spindle 23, as the parts are viewed in FIG. 2, to limit the flow of a damping fluid from chamber to chamber upon oscillation of the gimbal assembly. The volumes of the two chambers vary inversely in response to tilting of the gimbal and rotor about the axis of shaft 26. When the volume between spindle 23 and bore 29 is filled with a viscous damping fluid, such as oil, the aforesaid tilting effects a transfer of fluid between chambers, across the top edge of block 38, to thereby provide a simple and effective damper. Since block 38 is more sensitive to temperature changes than the metals used for the other parts, an increase in ambient temperature causes its top edge to approach closer to cap 37 thereby decreasing the cross-sectional area of the orifice or passageway between chambers. Since the viscosity of the damping fluid decreases with increase in temperature, the damping factor may be made to remain substantially constant over the range of normal temperatures to which the instrument is subjected in use.

The gyro rotor, spinning and constraining means

In the instrument comprehended by the invention, the gyro rotor and the stator for driving the same are both novelly mounted as a part of the gimbal assembly so that the same oscillate as a unit about the axis of shaft 26. Accordingly, for a given power input the transmission of power to the rotor is the same independently of the angular position of the rotor about the axis of shaft 26 and a more constant speed of rotation is attainable. In the form illustrated, the gyro rotor generally identified at 41 is in the form of two integrally connected parts both of which are solids of revolution having a common central axis. The inner part or sleeve 42 of the rotor has an inner cylindrical surface to receive with a smooth fit the outer races of bearings 33 and 34, and is provided at its lower edges with an internal flange 43 forming an abutment for the outer races of lower bearing 33. This part is internally threaded at its top to accommodate an annular nut 44 which, when turned home, forces the two outer races against flange 43 and holds them firmly in assembled relation to rotatably support the rotor.

The inner part of rotor 41 also comprises a sleeve 45 which encircles the inner sleeve 42, the two sleeves being connected at the top by an integral flange or web 46. As shown, an annular rim element 47, which is preferably made of tungsten or other heavy material, has a shrink fit about sleeve 45 to afford the maximum mass moment of inertia about the spin axis. The inner part comprising sleeves 42 and 45 and their connecting web 46 is made of magnetic material, such as magnetic alloy steel, cobalt steel or the like. It is contemplated, however, that the rotor may be formed by turning from a single piece of magnetic metal, such as cobalt steel which has been properly hardened and drawn for magnetic property.

The stator element is shown to comprise a sleeve 48 secured to and extending about skirt 30 of the gimbal, and so dimensioned that its lower edge is substantially coincident with the corresponding edge of the skirt, while its upper portion extends into the annular space between rotor sleeves 42 and 45 and closely adjacent the former. The upper end of the stator sleeve 48 is externally shouldered at 49, FIGS. 2 and 3, to form an upwardly facing abutment for laminated core 50 having its exterior cylindrical surface closely adjacent the interior surface of rotor sleeve 45 and provided with windings 51, 52, 53, 54, etc., which when energized are effective, in a known manner, to spin the rotor at a very high speed.

Figure 4:
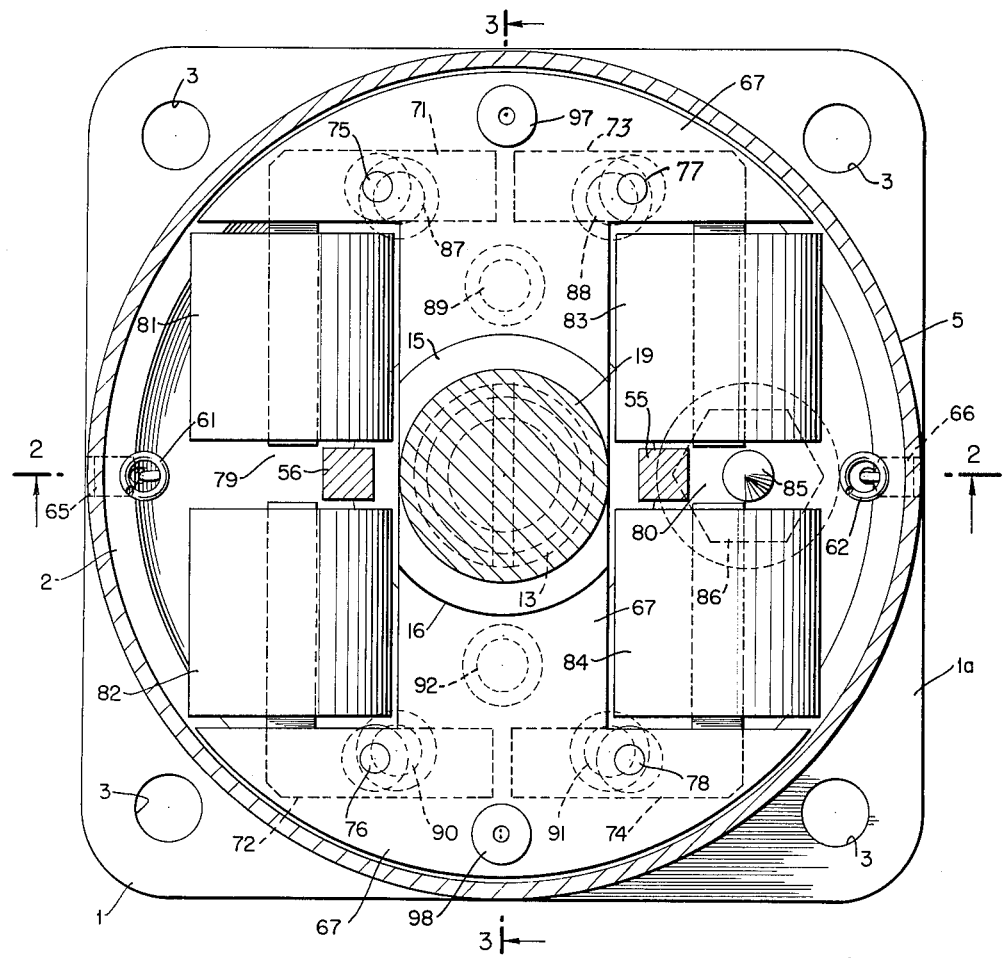
FIG. 4 is a cross sectional view about the same scale as FIGS. 2 and 3, taken in a plane identified by line 4—4, FIG. 2.

From FIGS. 2 and 4 it will be noted that the stator sleeve 48 is provided at diametrically opposite points in a plane normal to the axis of shaft 26, with a pair of depending pick-off arms 55 and 56, shown as square in cross section. The function and operation of these is described in the following chapter on the pick-off mechanism. For the present, however, it is pointed out that these arms effectively assist in the balancing of the rotor-gimbal assembly about shaft 26 so that the sensitive element may be precisely balanced or placed in neutral equilibrium about the axis of shaft 26 by the proper proportioning of the parts thereof. In an instrument of the type illustrated it is sufficient if the center of gravity of the sensitive assembly coincides with the axis of shaft 26. The simplicity of the parts and the small number thereof simplify the production of a suitably balanced unit. Due to the comparatively large distance of the lower ends of arms 55 and 56 below shaft 26, a small angular movement or precession of the rotor and gimbal about the axis of this shaft results in a magnified movement of the lower ends of the arms. The sensitivity of the instrument is thereby increased.

At its lower edge stator sleeve 48 is provided with two diametrically opposed recesses or holes 57 and 58, FIG. 2, aligned along a diameter of the sleeve in a plane normal to shaft 26. The reduced ends of two studs 59 and 60 are pressed into or otherwise secured in said holes so that the studs are fixed in aligned positions radially of the sleeve. The outer end of each stud is drilled with a vertical diametral hole to receive the upper end of a respective one of two centralizing coil springs 61 and 62. Each stud is also drilled and tapped to take set screws 63 and 64 to adjustably secure each spring to its stud in a manner clear from inspection of FIG. 2.

The springs 61 and 62 are vertically disposed and their lower straight ends extend into holes in base 1 where they are adjustably secured by set screws 65 and 66 (FIGS. 2 and 4). These springs are of equal rates and are adjusted to normally maintain the sensitive element comprising the gyro rotor and gimbal in the central position shown upon the drawing, that is to say, in the position which the parts assume when no angular movement is taking place having a component about an axis horizontally normal to shaft 26. The function is more fully described in the subsequent chapter "Function and Operation."

*The pick-off and circuit connections*

The pick-off shown is of the inductive bridge type in which two induced voltages are normally equal and opposite in phase when the gyro rotor is in the normal or central position. Upon precession in one direction of rotation or the other, the voltages are correspondingly and differentially varied to provide a resultant voltage whose average value increases with the angle of precession and whose phase depends upon the direction of precession. In a well known manner, this resultant or output voltage may be used to control a phase-sensitive relay which in turn may control servos, follow-up motors, indicators or the like to effect the desired control or indication.

A flat one-piece mounting plate 67 of inductive material, as best shown in FIG. 4, has opposed segmental ends connected by a diametrally extending strip having a central hole 68 to fit about sleeve 20. From FIG. 2 it is noted that the plate is positioned between and in contact with the lower face of flange 15 and the upper end of base sleeve 7 to fix the plate to the pedestal-base assembly.

In addition to plate 67, the two magnetic circuits include four L-shaped laminated cores identified in FIG. 4 as 71 through 74, respectively, all of which are secured by machine screws 75 through 78, respectively, to the under side of the segmental ends of the plate and in symmetrical relation. Still referring to FIG. 4, it is noted that the pair of cores 71 and 72 are arranged to define a gap 79 between their adjacent ends. There are thus formed two magnetic circuits, one through cores 71, 72 and plate 67, across gap 79, and the other through cores 73, 74 and plate 67, across gap 80.

The aligned legs of cores 71 and 72 are provided with induction coils 81 and 82, respectively, and the corresponding legs of cores 73 and 74 are provided with coils 83 and 84, respectively. Referring particularly to FIGS. 2 and 4, pick-off arms 55 and 56 forming integral parts of and depending from stator sleeve 48 are so positioned that in the neutral or null position shown, arm 56 lies immediately at the inner side of gap 79 while arm 55 is correspondingly positioned with respect to gap 80. In this construction precession of the sensitive element about shaft 26 in the clockwise direction as the parts are viewed in FIG. 2 causes arm 56 to move into gap 79 and arm 55 to increase its separation from gap 80. Contrariwise, precession in the counterclockwise direction effects a movement of arm 55 into gap 80 while simultaneously increasing the separation of arm 56 from gap 79. Thus, the reluctance of the two magnetic circuits previously identified are differentially varied by and in accordance with the direction of precession, and to a degree dependent upon the angular extent of such precession.

To provide for equalization of the reluctances of the two circuits when arms 55 and 56 are in the neutral position shown, there may be provided a soft iron screw 85 threaded through an aperture in base 1 and having its upper end pointed and its lower end slotted for an adjusting tool. A lock nut 86 holds the screw in adjusted position. The pointed upper end of the screw is positioned closely adjacent gap 80 and the contiguous ends of cores 73 and 74 so that by turning the screw, a very fine adjustment of the reluctance of this magnetic circuit is afforded. Of course, where manufacturing tolerances are sufficiently close, screw 85 may be omitted, or the circuits may be equalized in the neutral position by other means, such as variable elements in the external circuit.

Current is led to the stator windings and to the pick-off coils through a total of six terminal prongs symmetrically arranged and projecting downwardly from base 1 so that the instrument may be readily assembled with the body of which it forms a part, by pressing the prongs into the sockets or apertures of a receptacle, not shown. Thus, referring to FIG. 4, there are three contact prongs 87, 88 and 89 arranged at the apices of a triangle at one side of base 1, and three others 90, 91 and 92 similarly arranged at the other side of the base. FIG. 3 shows that each prong is anchored at its upper end in base 1 by an insulating bushing, such as 93, for prong 89. It will also be noted that the prongs have their lower ends reduced to form annular channels into which retaining springs, not shown, may engage to releasably retain each prong in its aperture in the socket member and to assure good electrical contact.

Three-phase current is led to the stator windings through leads 94, 95 and 96 (FIG. 3) connected respectively to prongs 87, 90 and 91. From this figure it is noted that lead 94 passes through an insulating bushing 97 fixed in an aperture in mounting plate 67. Likewise, leads 96 and 95 pass through an insulating bushing 98. Each lead includes a coil such as 99 for lead 94, whereby the leads effect only negligible restraint upon the sensitive element.

Referring more particularly to FIG. 7 showing the pick-off circuit, exciting current for pick-off coils 81, 82, 83 and 84 is led in from a source 100, over lead 101 to a terminal 102, thence to prong 89 in base 1, and to coils 81 and 82 in series, lead 103, coils 83 and 84 in series, to prong 88, thence to terminal 104 and lead 105 back to the source. Balancing impedance elements, such as resistors 106 and 107, each have one lead connected with terminals 102 and 104, respectively. The remaining terminals of elements 106 and 107 are each connected by leads 108, 109 with one input of amplifier 110. A second amplifier input is connected by lead 112 with terminal or junction 111 in lead 103, thence through prong 92 and lead 113. The amplifier outputs 114 may be connected to control any desired external circuit, such as to a servo or follow-up, not shown, in a manner well known to those skilled in the art.

*Function and operation*

The invention operates upon the well known law that when a torque is applied to a spinning body tending to change the direction of its spin axis, the body precesses, or attempts to precess, by the shortest path, to place its spin axis parallel with or in alignment with the axis of the applied torque and in such a direction that the directions of rotation of the rotor and the applied torque will be the same when and if full alignment is attained. In view of the constraint effected by the normally balanced springs 61 and 62, and the fluid damping means previously described, the angle of precession is small and substantially proportional to the angular rate of turn to which the instrument responds.

Thus, with rotor 41 spinning at very high speed, any angular movement of base 1 or, more generally, of the object to be controlled, having a component about a horizontal axis in the plane of FIG. 2, causes the rotor to precess or move about the axis of shaft 26 through an angle substantially proportional to the angular rate of the component. Assuming the direction of rotor spin to be clockwise in FIG. 4, a component torque clockwise, looking from the right in FIG. 2, will result in clockwise precession, FIG. 2, about the axis of shaft 26. Contrariwise, a component torque counterclockwise looking from the right in FIG. 2, will result in a counterclockwise direction of precession about said axis.

When counterclockwise precession takes place, for example, arm 55 is moved into gap 80 between the ends of cores 73 and 74 to thereby proportionately reduce the reluctance of their magnetic circuit. Simultaneously arm 56 is moved away from gap 79 between its cores 71 and 72 to increase the reluctance of their magnetic circuit. As a result of the ensuing unbalance of the bridge circuit, a voltage is applied to amplifier 110 whose phase varies with the direction of precession of the gyroscope rotor and whose amplitude is substantially directly proportional to the angle of precession and the component rate of angular movement. Where screw 85 is omitted, balancing of the bridge circuit may be effected by adjustment of one or both of the elements 106 and 107.

It will be understood, of course, that the parts are so balanced that the center of gravity of the sensitive element, that is, the rotor, gimbal and parts carried thereby, is on the axis of shaft 26, preferably but not necessarily at the intersection of the spin axis and the axis of shaft 26. It is thus obvious that the invention may be so mounted as to be responsive to component movements about any pre-selected axis. Thus, merely by way of example, the instrument may be so mounted upon an aircraft so that shaft 26 is positioned in the fore-and-aft direction of the craft. The instrument will then be responsive to pitch, so that amplifier 110 may be connected to control the elevator servos to maintain the craft in a desired or pre-selected attitude in the fore-and-aft vertical plane. As a further example, the instrument may be assembled as a part of a rocket to effect a precise control of its attitude in any predetermined plane. The possible uses of the instrument are many and varied, as will be obvious to those skilled in the art.

*Modifications*

Various modifications of the model selected for illustration herein are possible without affecting the function or utility of the instrument. For example, the rotor may be made in the form of a one-piece turning of magnetic material. Centralizing coil springs 61 and 62 may be replaced by folded or accordion type springs. By proper insulation of the ends of the springs, or by mounting the inner ends of their studs 59 and 60 in insulating bushings, the springs may serve the dual function of centralizing and current leads to the stator coils. In this case, leads 94, 95 and 96 could be omitted by having two coil or accordion type springs at one side and having a combined rate equal to a single like spring at the other side. Of course, when used as electrical leads to the stator, the two springs at one side would be electrically insulated from each other and from base 1 and the stator sleeve, and could be balanced by two like springs at the other side. This could be done by providing a stud such as 59, 60 for each spring, all mounted in bushings to insulate them from each other. The windings of the stator and the studs for supporting the centering or centralizing springs may be unitarily potted and encapsulated in insulating material to provide additional mechanical strength. The inductive pick-off mechanism shown may be replaced by other forms of differential inductive arrangements, by photoelectric cells normally energized by respective light sources which are differentially cut off by arms 55 and 56 in response to precession about the axis of shaft 26, by air jets, or other suitable known arrangements. The heat responsive element 38 or its equivalent is a necessary element of the damping means formed by spindle 23 and gimbal sleeve 28 only when automatic compensation for temperature changes is desired.

In the specification and claims, the terms "vertical," "horizontal," "upwardly," "lower" and similar terms refer to the positions in which the respective parts appear in FIGS. 2 and 3 of the drawings and not necessarily to the positions or relations in which the parts may be located in actual use.

In the claims, the term "fixed" when used in connection with base 1 or pedestal 19 means that these parts do not partake of motion about any axis of freedom of the instrument, per se.

While a preferred form of the invention has been disclosed in the foregoing specification and accompanying drawings, other modifications and substitutions of equivalents will occur to those skilled in the art after a study of the disclosure of the present invention without departing from the spirit and scope of said invention. Hence, the description should be taken in an illustrative rather than a limiting sense.

What is claimed is:

1. In a rate gyroscope, a fixed pedestal comprising a spindle having a vertical first axis, a sleeve-like gimbal element, bearing means mounting said element on and about said spindle for pivotal movement only about a second axis diametral of said element and normal to and intersecting said first axis, and a rotor journalled on said element for spinning about a third axis normal to said second axis.

2. In a constrained, two-degree-of-freedom, rate gyroscope, a fixed pedestal having a vertical first axis, bearing means carried by said pedestal and defining a second axis normal to said first axis, a sleeve-like gimbal encircling said pedestal and diametrally mounted on said bearing means for pivotal motion only about said second axis, and a rotor journalled on said gimbal for spinning about a third axis normally coincidental with said first axis, all said axes being concurrent at a point.

3. A gyroscopic instrument comprising a base, a pedestal fixed with said base and having a vertical first axis, a gimbal sleeve encircling and mounted upon said pedestal for pivotal movement about a first-degree-of-freedom axis diametral of said sleeve and normal to said first axis, a rotor journalled on said sleeve for spinning about a second-degree-of-freedom axis coincident with the axis of said sleeve and normal to said first-degree-of-freedom axis, and stator means fixed with and carried by said sleeve for spinning said rotor.

4. In a two-degree-of-freedom, constrained rate gyroscope, a pedestal comprising a fixed spindle having a vertical first axis, a gimbal comprising a first sleeve loosely fitting about said spindle, a first bearing means mounting said gimbal directly on said spindle for angular movement about a second axis normal to said first axis, a rotor comprising a second sleeve extending externally about said first sleeve, and second bearing means between said sleeves and journalling said rotor for spinning about a third axis normal to said second axis.

5. A rate gyroscope as defined in claim 4 comprising a pair of pick-off arms fixed with and depending from said first sleeve on diametrally opposite sides of said second axis.

6. In a gyroscope, a fixed pedestal having a vertical first axis, a gimbal sleeve loosely encircling the upper end of said pedestal and mounted thereon for angular motion about a second axis normal to said first axis and diametral of said gimbal sleeve, a rotor journalled directly on said sleeve for spinning about a third axis perpendicular to said second axis, stator means for spinning said rotor and fixed with and carried by said gimbal sleeve, a pair of pick-off arms fixed with said gimbal sleeve, and depending therefrom upon opposite sides of said second axis, the centroid of said sleeve, rotor, stator means and arms in assembly being substantially at a point on said second axis.

7. In a gyroscope, a fixed base, a pedestal fixed with said base and including a spindle, a gimbal element comprising a sleeve extending about said spindle and journalled thereon, a rotor having a rim extending circumferentially about said sleeve, bearing means journalling said rotor directly on said gimbal element for spinning, a stator fixed with said gimbal element in cooperative relation with said rim for spinning said rotor, pick-off means fixed with and depending from said gimbal element, and inductive means carried by said base in cooperative relation with said pick-off means.

8. In a gyroscope, a base, a pedestal fixed with said base and extending upwardly therefrom, said pedestal having a central vertical axis, a gimbal comprising a sleeve extending about said pedestal, a shaft fixed in said pedestal diametrally thereof and having its ends journalled in said sleeve to mount the same for pivoting about a second axis normal to said vertical axis, anti-friction bearings fitting about said sleeve exteriorly thereof, a rotor journalled on said anti-friction bearings for spinning about a third axis normal to said second axis, a stator fixedly mounted on said sleeve and extending about said bearings, said anti-friction bearings including an inner sleeve engageable by the ends of said shaft.

9. A constrained, two-degree-of-freedom rate responsive gyroscope comprising a base, a pedestal fixed with and rising from said base and having a first central axis, a gimbal comprising a first sleeve extending about said pedestal, a shaft carried by said pedestal and defining a second axis normal to and intersecting said first axis at a point, the ends of said shaft extending into diametral apertures in said first sleeve to pivotally mount the same, a rotor comprising a second sleeve and a rim connected only at their top portions, anti-friction bearing means between said sleeves to journal said rotor for spinning, a stator support fixed with said gimbal, and a stator mounted by said support in the annular space between said second sleeve and rim.

10. A gyroscope as defined in claim 9 wherein said stator cooperates with said rotor rim to spin the rotor about a third axis normal to said second axis.

11. A gyroscopic instrument comprising a fixed base, a pedestal fixed with said base and having a first axis normal to and extending from the base, a gimbal element, means mounting said element on said pedestal for angular movement about a second axis normal to said first axis, a rotor journalled on said gimbal element, and inductive spinning means for said rotor carried directly by said gimbal element.

12. In a gyroscope, a pedestal having a first vertical axis, a gimbal emcompassing the upper end of said pedestal and journalled thereon for movement about a horizontal axis, a rotor carried by said gimbal for spinning about a third axis normal to said horizontal axis, inductive pick-off means fixed with said pedestal at the base thereof, induction varying means fixed with said gimbal and depending therefrom into cooperative relation with said pick-off means, and resilient means connected with said gimbal and yieldingly urging the spin axis of said rotor into predetermined angular position about said horizontal axis.

13. A gyroscope comprising a rotor, means mounting said rotor for spinning about a first axis and for precession about a second axis at an angle to said first axis, said mounting means including a damper comprising means forming a fluid chamber, a viscous fluid filling said chamber, and closely interfitting spherical surfaces of revolution concentric with and relatively movable about said second axis to seal said fluid within the chamber.

14. A gyroscope comprising a rotor, means mounting said rotor in neutral equilibrium for spinning about a first axis and for precession about a second axis normal to and intersecting said first axis at a point, said mounting means including a damper comprising interfitting concave and convex spherical surfaces both concentric of said point, and resilient means yieldingly urging said rotor into predetermined position about said second axis.

15. In a gyroscope, a pedestal having a vertical first axis, the upper end of said pedestal being shaped as a concave spherical surface concentric of a point on said axis, a spindle extending upwardly from said surface along said axis, bearing means carried by said spindle and defining a precession axis normal to and intersecting said first axis at said point, a gimbal sleeve fitting about said spindle and having its lower surface convexly spherical about said point and mounted by said bearing means for angular motion about said precession axis, said surfaces interfitting, a rotor journalled on said gimbal sleeve for spinning about a third axis normal to said precession axis, means closing the upper end of said sleeve to form a closed chamber for damping fluid between said sleeve and spindle, and a strip of thermostatic material in the upper end of said spindle and having its upper edge closely adjacent said closing means to form therewith a damping orifice dividing said chamber and whose cross-sectional area varies in response to changes of ambient temperature.

16. A gyroscope as defined in claim 15, a stator sleeve fixed with and surrounding said gimbal sleeve, a stator fixed with said stator sleeve and energizable to spin said rotor, studs fixed in and extending from opposite sides of said stator sleeve, and resilient means secured to the ends of each stud, said resilient means leading current to said stator and yieldably centralizing said gimbal sleeve about said precession axis.

17. In a gyroscope, a base, a rotor, means mounting said rotor on said base for spinning about a first axis and for precession about a second axis at an angle to and intersecting said first axis, inductive core means carried by said base and defining a pair of magnetic circuits each including a gap, said gaps being spaced in a plane perpendicular to said second axis, and a pair of pick-off arms fixed with said mounting means and each positioned adjacent one of said gaps to differentially vary the reluctance of said circuits in response to precession of said rotor.

18. In a gyroscope, a base, a rotor, means mounting said rotor on said base for spinning about a first axis and for precession about a second axis at an angle to and intersecting said first axis, core means carried by said base and defining a pair of magnetic circuits each including a gap, a pair of pick-off arms fixed with said mounting means, each said arm being positioned adjacent a respective one of said gaps to differentially vary the reluctance of said circuits in response to precession of said rotor, a bridge circuit including opposed coils carried by said base in inductive relation with said core means, and control means in said circuit responsive to phase and amplitude of the resultant current.

19. A gyroscope comprising support means, gimbal means mounted on said support means for pivotal movement about an axis, said support means and gimbal means cooperating to form two diametrically disposed chambers at opposed sides of a plane containing said axis, said chambers having communication via the clearance between said support means and said gimbal means, and a viscous fluid filling said chambers whereby relative pivotal movements of said support means and said gimbal means are damped.

20. A gyroscope as defined in claim 19 comprising temperature responsive means for varying the flow path for said fluid between said chambers.

21. A gyroscope as defined in claim 20 wherein said temperature responsive means is expansible with increases in temperature to reduce the area of said flow path when the temperature of said fluid is correspondingly increased to reduce the viscosity thereof.

22. A gyroscope as defined in claim 20 wherein said temperature responsive means comprises a block mounted in a transverse slot in said support means.

23. In a two-degree-of-freedom, constrained, rate-responsive gyroscopic instrument, a fixed base, a pedestal extending from said base and fixed at one end therewith, a gimbal extending about said pedestal at the other end thereof, bearing means mounting said gimbal on said pedestal for pivotal motion about a precession axis transverse thereto, a rotor, bearing means mounting said rotor on said gimbal for spinning about an axis normal to said precession axis, and spring means acting between said base and said gimbal to yieldingly urge the latter and said rotor into predetermined angular position about said precession axis.

24. A gyroscopic instrument as defined in claim 23, wherein said spring means includes a pair of aligned arms fixed at their inner ends with said gimbal and extending radially therefrom upon opposite sides of said pedestal, and a pair of springs each connected at one end with the distal end of a respective arm and at its other end with said base.

25. Apparatus comprising movable means including a pair of pick-off arms, inductive core means defining a pair of magnetic circuits each including a gap, a portion of said core means being common to both of said circuits and said gaps being on opposed sides of said common portion of the core means, each of said arms being positioned adjacent one of said gaps and movable in the path of magnetic flux across the gap adjacent thereto to differentially vary the reluctance of said circuits in response to movements of said movable means, a bridge circuit including a coil in inductive relation with said core means of each magnetic circuit, said coils being in different branches of said bridge circuit and connected in series across a source of alternating current, and control means responsive to the variable current output of said bridge circuit resulting from variations in the reluctance of said magnetic circuits.

26. Apparatus comprising a movable member, a spindle extending into a recess in said member, means for pivotally supporting said member on the spindle, said recess and spindle being shaped to permit pivotal relative movement of the member and spindle and to form a fluid chamber in the recess around said spindle, a viscous fluid filling said chamber, and means sealing the open end of said recess comprising closely interfitting spherical surfaces of revolution on said member and spindle.

27. Apparatus comprising a movable member, a spindle extending into a recess in said member, means for pivotally supporting said member on the spindle, said recess and spindle being shaped to permit pivotal relative movement of the member and spindle and to form a fluid chamber in the recess around said spindle, a viscous fluid filling said chamber, and means restricting flow of said fluid from one side of said spindle to the other in said chamber whereby relative pivotal movements of said member and spindle are damped.

28. Apparatus as defined in claim 27 wherein said flow restricting means is temperature responsive for varying the flow area for said fluid in response to changes in temperature.

29. Apparatus as defined in claim 28 wherein said flow restricting means decreases said flow area in response to increases in temperature.

30. Apparatus as defined in claim 25 wherein the polarity of the output of said bridge circuit varies in accordance with the direction of movement of said pick-off arms from a predetermined position.

31. Apparatus as defined in claim 25 wherein the amplitude of the output of said bridge circuit varies in accordance with the magnitude of the movements of said pick-off arms from a predetermined position.

32. Apparatus as defined in claim 25 comprising means in the other branches of said bridge circuit for normally equalizing the voltages at the output terminals of said bridge circuit.

33. Apparatus comprising movable means including a pair of pick-off elements and inductive core means defining a pair of magnetic circuits having a portion of said core means in common and each including a gap, said common portion of the core means being positioned between said gaps and said elements, each of said elements being positioned adjacent one of said gaps to vary the reluctance of said circuits in response to movements of said movable means.

34. A rate gyroscope comprising a fixed pedestal having a first axis, a gimbal element, means mounting said gimbal element on the pedestal for pivotal movement only about a second axis normal to said first axis, and a rotor journalled on said gimbal element for spinning about a third axis normal to said second axis, said means for mounting the gimbal on the pedestal consisting of means within the journal for the rotor.

35. Motion detecting apparatus for gyroscopes and the like comprising a pair of inductance coils, means connecting said coils in different branches of a bridge circuit, means connecting a source of electrical energy to the input terminals of said bridge circuit for energizing said coils, core means for the coils forming a magnetic circuit for the magnetic flux generated by each coil, said core means having a portion thereof common to both said magnetic circuits, each said magnetic circuit including a gap in said core means and said gaps being on opposed sides of said common portion of the core means, and movable means for varying the reluctance of the magnetic circuit for the magnetic flux generated by at least one of said coils to vary the output of said bridge circuit, said movable means comprising an element positioned adjacent each of said gaps and movable in the path of magnetic flux across the gap adjacent thereto.

(References on following page)

References Cited by the Examiner

UNITED STATES PATENTS

| | | |
|---|---|---|
| 2,484,022 | 10/1949 | Esval. |
| 2,488,734 | 11/1949 | Mueller. |
| 2,590,029 | 3/1952 | Minorsky _____ 74—388 X |
| 2,669,126 | 2/1954 | Simmons et al. |
| 2,752,790 | 7/1956 | Draper. |
| 2,753,718 | 7/1956 | Howe. |
| 2,787,909 | 4/1957 | Ruckstahl. |
| 2,829,521 | 4/1958 | Kuipers _____ 74—5.5 |
| 2,852,943 | 9/1958 | Sedgfield. |
| 2,868,023 | 1/1959 | Bonnell _____ 74—5 X |
| 2,896,455 | 7/1959 | Bishop et al. |
| 2,948,155 | 8/1960 | Burkam. |

FOREIGN PATENTS

| | | |
|---|---|---|
| 740,349 | 11/1955 | Great Britain. |

BROUGHTON G. DURHAM, *Primary Examiner.*

SAMUEL SPINTMAN, *Examiner.*